Sept. 27, 1966 R. GLASS ETAL 3,275,158

ENVELOPE CONTAINER STORAGE DEVICE

Filed Sept. 22, 1964 2 Sheets-Sheet 1

INVENTORS
Ronald Glass
Raymond Andrel
Albertis S. Harrison, III
BY
ATTORNEY

ENVELOPE CONTAINER STORAGE DEVICE

Filed Sept. 22, 1964 2 Sheets-Sheet 2

INVENTORS
Ronald Glass
Raymond Andrel
BY Albertis S. Harrison, III
ATTORNEY 3,275,158
Patented Sept. 27, 1966

1

3,275,158

ENVELOPE CONTAINER STORAGE DEVICE

Ronald Glass, Washington, D.C., and Raymond Andrel, Vienna, and Albertis S. Harrison III, Fairfax County, Va., assignors to Keltec Industries Inc., a corporation of Virginia Filed Sept. 22, 1964, Ser. No. 398,245
7 Claims. (Cl. 211—40)

This invention relates in general to record storage devices and in particular to such devices incorporating means for locating records therein.

It is well recognized by those who collect phonograph records that conventional means for rack storage of records in their folder, i.e., in vertical, side-by-side alignment with only the edge of each record folder visible, do not enable a quick determination of the location of any desired record. In particular, the thin edge of each folder does not permit a clear printed identification of its contents. Consequently, it is necessary to accurately file each folder in a selected order after each use in accordance with a selected filing system. Otherwise, records can be located only on a hit or miss basis by partial removal from the rack. It will be appreciated that the accurate filing approach is subject to failure when the user is unfamiliar with the filing system and that extensive handling of the record folders, as occurs in the hit or miss exploration, may adversely affect the record contained therein.

Accordingly:

It is an object of this invention to provide a record storage unit which enables a quick determination of the location of selected records therein.

It is another object of this invention to provide a record storage unit with means for locating records therein which does not require a precise filing arrangement.

It is also an object of this invention to provide a record storage unit with means for locating records therein which may be adapted for the storage of any number of records.

It is a further object of this invention to provide a record storage unit with means for locating records therein which may be utilized under minimum lighting conditions.

Other objects of this invention will become apparent upon a more comprehensive understanding of the invention for which reference is had to the following specification and drawings wherein.

Figure 1:
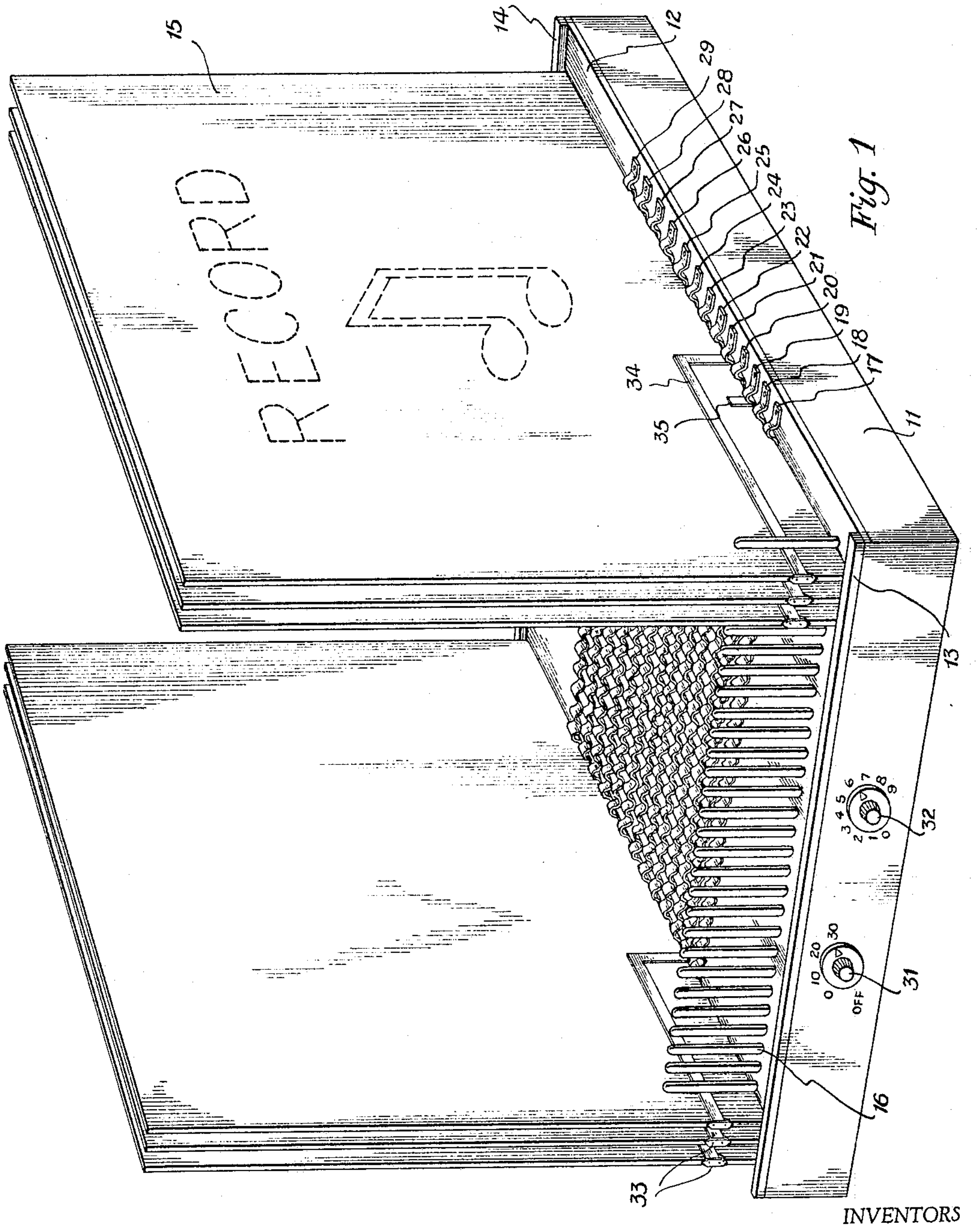
FIGURE 1 depicts the record storage unit of this invention in one embodiment thereof.

Briefly, the device of this invention is a record storage device for use in storing photograph and other types of records in a cardlike member. The storage unit which supports the cardlike member includes an energization network and control means therefor. Each cardlike member has a respective light element which is energized by means of an electrical coding associated with each cardlike member.

Referring now to the drawings:

FIGURE 1 shows a relatively compact phonograph record embodiment of the device of this invention with a rectangular base 11 and a flat top surface, indicated at 12. In this embodiment, the top surface 12 which may be

2 other than rectangular and other than flat, if desired, is made of electrically non-conductive material, for example, fiberboard of the Masonite variety, which is sufficiently sturdy to support a group of records. Stop means 13 and 14 are provided, such that standard record envelopes 15 may be set on edge in juxtaposition therebetween, approximately 12⅜ inches apart. It will be appreciated that the stop means 13 and 14 may be other than a physical obstruction, as shown, and that any means, visual or otherwise, may be employed to insure a precise disposition of the record envelopes 15 with respect to a reference line. In particular, it will be recognized that it is not essential that two stop means be utilized and if two stop means are utilized, that they may differ, if desired.

In accordance with the basic teaching of this invention, support means 16 are provided to maintain the record envelopes 15 in vertical alignment and in spaced relation to insure electrical isolation between envelopes. In this embodiment the support means 16 comprises a row of elongated studs disposed in perpendicular relation to the surface 12 with a selected spacing between studs to permit the insertion of the record envelopes 15. While the row of studs 16 is shown in parallel relation with the stop means 13 and 14, it is, of course, within the purview of this disclosure to dispose the support means in any desired pattern on the surface 12. More particularly, the support means 16 may have a configuration other than the stud form shown in FIGURE 1.

In the exemplary embodiment of FIGURE 1, a plurality of conductive strips 17–29 are aligned in a predetermined, uniform spaced relation with respect to each other and the line of reference is defined by the stop means 13 and 14. It is understood, of course, that a greater or lesser number of conductive strips may be employed dependent upon the number of record envelopes to be accommodated.

In the embodiment of FIGURE 1 the conductive strips are in parallel relation and each strip is corrugated such that the record envelopes will rest in the corrugation valleys. It is readily apparent that the corrugations may have a less rounded configuration, and the strips may in fact, be folded in accordian pleat fashion, if desired. Likewise, a wire form may be substituted for the conductive strip and this wire form may be straight, corrugated, coiled or otherwise in selected applications.

Switch means 31 and 32 having five switch positions and ten switch positions, respectively, are shown mounted on the base 11. These switch means are electrically connected in a manner to be described hereinafter such that indicator means 33 associated with each record envelope 15 may be energized in respective order as determined by the setting of the switch means 31 representing the tens digit and the switch means 32 representing the units digit. Thus the indicator associated with the record envelope coded 29, for example, can be energized by placement of the switch means 31 in the 2 position and the placement of the switch means 32 in the 9 position.

In FIGURE 1, each of the record envolpes are coded by means of two metallic interconnections 34 and 35 each of which folds over the bottom of the envelope at a selected point and is electrically connected to a respective terminal of the bulb which serves as the indicator means 33 in this embodiment. It has been found that miniature neon bulbs with bare wire leads may be employed as the indicator means 33 and that metal tape commercially available with adhesive on one side may be utilized for the metallic interconnections 34 and 35. In the illustrative embodiment, of FIGURE 1, the neon bulb and its bare wire leads are affixed to the edge of the record envelope by means of clear plastic adhesive backed tape such that the glow of the energized neon bulb will be visible to the observer. It will be appreciated, of course, that other types of metallic interconnection means 34, 35 and other types of indicator means may be utilized, if desired, and that those shown in the drawing are merely for purposes of clear illustration of the invention in one selected embodiment thereof. Moreover, it will be appreciated that the two interconnection means 34 and 35 may be on the same side of the envelope in the event one side of the record envelope should not be defaced by the attachment of opaque means.

Figure 2:
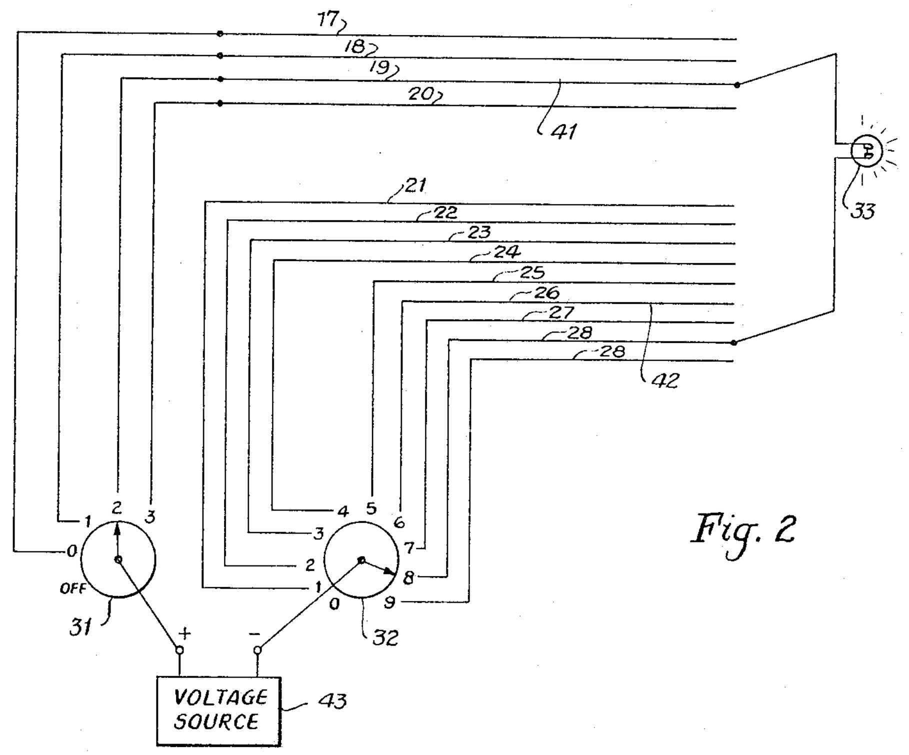
FIGURE 2 is a showing of an electrical circuit suitable for use in the embodiment of FIGURE 1.

As shown in FIGURE 2 the plurality of conductive strips 17–19 are grouped electrically into two sections indicated at 41 and 42. In this embodiment, the conductive strips 17–20 are identified as section 42. In accordance with the invention switch means 31 and 32 may be rotary switches with the rotary contact of each electrically connected to a respective terminal of a voltage source 43 which may be D.C. source, as shown. In this embodiment, a standard 90-volt B battery of the type commonly used in portable radios has been found to be suitable for energization of indicator means 33 of the neon lamp variety. It is recognized that various other low current sources may be employed as the source 43 including A.C. sources, if desired, provided adequate provision is made for current limiting for obvious personal safety reasons. Neon lamp indicator means 33 offer several notable advantages in the device of this invention and are generally preferred for use therein. In particular neon lamps are characterized by a high impedance unenergized condition and a low impedance energized condition which enables pulse starting, minimum operational current, and single lamp energization. The latter characteristic, single lamp energization is particularly significant in the device of this invention because the energization matrix formed by the plurality of conductive strips, interconnection means and indicator means does involve parallel paths which may result in plural energization of indicator means in the event illumination threshold impedance of several indicator means, such as low voltage filamentary lamps, are in an undesired relation.

Figure 3:
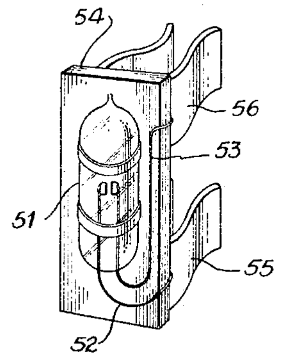
FIGURE 3 is a showing of an indicator means suitable for use in the embodiment of FIGURE 1.

FIGURE 3 depicts an indicator means suitable for use in the embodiment of FIGURE 1 and in other embodiments as well. In FIGURE 3, a neon lamp 51 having bare wire terminals 52 and 53 is affixed to an insulating base member 54. Two conductive clip means 55 and 56 also are affixed to the base member 54 selected in spaced relation such that they are electrically isolated and each of the clip means 55 and 56 is electrically connected to its respective one of the wire terminals 52 and 53. In operation, the metallic interconnection means 34 and 35 are affixed to the record envelop such that the two fold over the front edge of the record envelope in the selected spaced relation of the clip means 55 and 56 and the indicator means then is clipped thereto such that each of the clip means makes electrical contact with one respective interconnection means. It will be noted that the indicator means shown in FIGURE 3 is adaptable to envelopes having the interconnection means on either side of the record envelope or both on one side.

It will be appreciated that the device of this invention is not limited to the embodiment exemplarily shown herein and that other types of holder units may be adapted in accordance with the invention including enclosed units wherein a different edge of the record envelope may be visible. In particular, it is not essential that the indicator means be attached to an edge adjacent to the coded bottom edge and the edge opposite the bottom edge would serve equally as well in selected applications. More particularly, it is not essential that the bottom edge of the record envelope be coded although the bottom edge does afford contact advantages and is preferred in most applications.

It is recognized that the device of this invention is useful in many other file applications including general office filing applications. In such applications, the device of this invention would enable the executive staff to easily seek out file records in the absence of the clerical staff.

Moreover, it will be appreciated that the conductive strip matrix and the switch means 31 and 32 may be separate units with a simple electrical interconnection if desired. Likewise, it will be appreciated that the conductive strip matrix may consist of any number of groupings with a respective switch means for each grouping in serial connection with other switch means to a respective voltage source terminal.

The indicator means 33 may be of any variety which produces a human sensorial response. Therefore, the device is adaptable for use, for example, in touch sensory applications where a visually observable indication may be impossible or undesirable.

Finally it is understood that this invention is to be limited only by the scope of the claims appended hereto.

What is claimed is:

1. An envelope container storage means for storing a plurality of relatively flat envelopes having at least one substantially uniform edge comprising a support surface, means for supporting said envelopes on said surface on said uniform edge in juxta position, means for positioning said envelopes in a uniform manner with respect a reference line on said surface, at least first and second pluralities of conductive strips each strip in said pluralities electrically isolated one from the other and disposed in a common relation at substantially all points thereon with respect said reference line and at respective distances therefrom, an electrical energy source having two output terminals, first and second switch means having a plurality of switch selection terminals, each of said switch means being electrically connected to respective output terminals of said electrical energy source, and adapted to interconnect said respective output terminal and any one of said plurality of switch selection terminals; means electrically connecting each of said switch selection terminals in said first switch means to a respective conductive strip in said first plurality thereof; means electrically connecting each of said switch selection terminals in said second switch means to a respective conductive strip in said second plurality thereof; two terminal indicator means adapted for electrical energization, first metallic interconnection means affixed to said envelope and disposed thereon to interconnect a respective terminal of said indicator means and one selected conductor in said first plurality thereof when said envelope is positioned in said uniform manner, and second metallic interconnection means affixed to said envelope and disposed thereon to interconnect a respective terminal of said indicator means and one selected conductive strip in said second plurality thereof when said envelope is positioned in said uniform manner.

2. An envelope container storage means as defined in claim 1 wherein said reference line is a straight line and said pluralities of conductive strips are in parallel relation thereto.

3. An envelope container storage means as defined in claim 2 wherein said first and second switch means are rotary switch means and contacts thereof are connected to respective output terminals of said electrical energy sources.

4. An envelope container storage means as defined in claim 3 wherein said indicator means are of the neon bulb variety and the output of said electrical energy source is sufficient to trigger and maintain energization of said indicator means.

5. An envelope container storage means as defined in claim 3 wherein said first and second metallic interconnection means are affixed to opposite sides of said envelope.

6. An envelope container storage means as defined in claim 5 wherein said means for supporting said envelopes are adapted to maintain each of said envelopes separate one from another.

7. An envelope container storage means as defined in claim 2 wherein said conductive strips are corrugated and said envelopes are supported in the valley of said corrugation.

References Cited by the Examiner

UNITED STATES PATENTS

| | | | |
|---|---|---|---|
| 2,570,046 | 10/1951 | Burns | 312—15 |
| 2,619,966 | 12/1952 | Gallia | 129—16.1 |

FOREIGN PATENTS

| | | |
|---|---|---|
| 593,012 | 10/1947 | Great Britain. |

CLAUDE A. LE ROY, *Primary Examiner.*

K. J. WINGERT, *Assistant Examiner.*